United States Patent [19]

Schatz et al.

[11] Patent Number: 5,124,099

[45] Date of Patent: Jun. 23, 1992

[54] PROCEDURE FOR MANUFACTURING OF FIREPROOF CERAMIC MOLDED PARTS

[75] Inventors: Uwe Schatz, Urmitz; Lorenz Dötsch, Vallendar; Andreas Batton, Rengsdorf; Jens Decker, Hühr Grenzhausen; Orfwin Rave, Niederfell; Helmut Schüller, Königswinter, all of Fed. Rep. of Germany

[73] Assignee: Radex-Heraklith Industriebeteiligungs Aktiengesellschaft, Vienna, Austria

[21] Appl. No.: 450,274

[22] Filed: Dec. 13, 1989

[30] Foreign Application Priority Data

Dec. 16, 1988 [DE] Fed. Rep. of Germany ....... 3842403

[51] Int. Cl.$^5$ ............................................. C04B 35/10

[52] U.S. Cl. ........................................ 264/63; 264/56; 501/133; 501/153

[58] Field of Search ................... 264/63, 56; 501/153, 501/133; 427/215

[56] References Cited

U.S. PATENT DOCUMENTS

| | | | |
|---|---|---|---|
| 3,238,048 | 3/1966 | Somers | 501/153 |
| 3,816,158 | 6/1974 | Jacobs | 427/215 |
| 4,177,235 | 12/1979 | Neidhardt | 501/153 |
| 4,725,467 | 2/1988 | Groh | 501/153 |
| 4,789,651 | 12/1988 | Sugie et al. | 264/63 |

Primary Examiner—James Derrington
Attorney, Agent, or Firm—John F. A. Earley; John F. A. Earley, III

[57] ABSTRACT

The invention concerns a procedure for manufacturing fireproof ceramic molded parts, particularly of high alumina content based materials.

20 Claims, No Drawings

PROCEDURE FOR MANUFACTURING OF FIREPROOF CERAMIC MOLDED PARTS

DESCRIPTION

The invention concerns a procedure for manufacturing fireproof ceramic molded parts, particularly those based on a high alumina content.

Molded parts of the abovementioned type are frequently used, particularly in the field of secondary metallurgy. Slide plates for slide locks may be noted as an example. The state of the art as well as the object of the invention are explained in greater detail in the following, with reference to the area of slide plate application, which does not constitute a restriction of the general area of application that also includes individual parts of a discharge system, submerged pipe, etc.

As can be seen in "Interceram, Special Issue 1987, proceedings '86, 10", ceramic bonded slide plates with a high alumina content are frequently used. The fireproof material basically consists of a mixture of sintered corundum and sintered mullite granules in a mullite matrix. The sintering temperature of such plates is above 1,450o0 and is primarily dependent on the mullite component. Mullite therein is introduced particularly in ground form.

After the sintering, the plates are generally dipped in tar once or twice and subsequently annealed at temperatures between 300° and 650° C. The ratio of vaporizable carbon components to the non-vaporizable ones in the plate can be controlled by changing the temperature. Tar impregnation and annealing significantly influence the durability of the slide plate.

The advantages of such a slide plate exists in the good stability with respect to temperature changes and the good heat properties compared to metal smelts. The disadvantages are in the relatively low corrosion resistance, particularly against Mn containing metal smelts, which is due in part to a significant mullite-phase-portion of 10% and more by weight.

In addition, slide plates with a zirconium dioxide base are known, some of these partially stabilized by means of MgO. These plates have extremely high erosion resistance as compared to a metal smelting. The disadvantage of both pure and partially stabilized zirconium oxide plates is a specific heat expansion behavior. An expansion takes place up to 1,100° C., followed by a contraction due to a microstructural monoclinic-tetragonal modification change. A further expansion occurs at temperatures above 1,300° C. In this regard, zirconium oxide based molded parts tend to crack due to phase changes, particularly molded parts which are not mechanically "affixed". In addition, the manufacturing is expensive.

The purpose of the present invention is to indicate a possibility for manufacturing fireproof ceramic molded parts, in particular of high alumina content based materials, whereby the described disadvantages are avoided. In particular, this concerns the manufacture of molded parts which are superior to known molded parts with respect to corrosion resistance in relation to metal smelts as well as with respect to constancy during temperature changes, this without having to forego positive stability properties with regard to temperature resistance.

The invention is based on the recognition that the disadvantages of known high alumina content fireproof molded parts are due, in particular, to an excess proportion of mullite. In the state of the art, a certain proportion of mullite has hitherto been considered indispensable, particularly in order to ascertain the favorable stability to temperature changes.

Contrary to the actions suggested in the state of the art, the invention suggests beginning with a relatively fine-grained fire-proof matrix material of high alumina content based materials and, by adding silica gel, promoting in situ formation of mullite when the prepared material mixture is fired, or preparing the mullite portion by means of a stochiometrically pre-set mullite gel which, due to the 'tailor-made' gel-form can be introduced into the fireproof matrix material in a much smaller quantity and, in spite of this, very much more uniformly. The quantity is determined by the proportion of $SiO_2$ to be introduced.

The use of silica gel in a liquid or viscous phase makes it possible to provide the individual solid particles of the fire-proof matrix material with a thin coating of silica gel. This coating serves as a binder between the particles of the fireproof matrix material and serves to form mullite in the subsequent firing or during use because of a reaction with the aluminum oxide, but only in the contact area of the individual aluminum oxide particles.

Thereby, it is of major importance that the proportion of silicic acid is significantly lower when it is introduced as silica gel than is the case for conventional molded parts of the abovementioned nature. For instance, the silica gel can be sprayed onto the particles of the fireproof matrix material when the material is prepared; thereby are already small quantities sufficient to form a thin surface coating which, however, is sufficient to create a satisfactory bonding between the aluminum oxide particles in the subsequent pressing, and thereby also sufficient green stability. It should be emphasized as an important characteristic that—apparently due to the high surface activity between the fine aluminum oxide particles coated with silica gel—one obtains almost 100% mullite phase formation relative to the total mass but as a significantly lesser and more finely distributed quantity than according to the state of the art.

Tests have shown that a $SiO_2$ proportion of approx. 0.5–4% by weight, relative to the total mixture, is sufficient to achieve good bonding of the matrix particles. With a 40% silica gel, the quantity gel to be added is thus between 1 and 9% by weight.

Hereby—as mentioned above—the selection of granular fractions in the fireproof matrix material plays an important role.

According to the invention, it is first assumed that the matrix material to be used has a maximum granule size of 3 mm, preferably maximum 1.2 mm. The finer the material, the higher the described surface activities. It is advantageous to subdivide the fireproof matrix material into at least two granular fractions, namely a first, coarser granular fraction, e.g. with a granule size between 0.3 and 1.2 mm which later assumes the function of "support grain" in the mold, and a finer granular fraction, e.g. less than 0.3 mm, which fills gaps between the coarser particles and, in combination with the surface coating of the gel, makes it possible to produce fireproof molded parts with a green stability that is already high.

The most general execution of the invention suggests a procedure for manufacturing of fireproof molded parts which includes the following steps:

Producing a mixture on the basis of a ceramic material with an A1203 content >90% by weight of the granular fraction smaller than 3.0 mm, 0.5-4% by weight SiO₂m introduced as silica gel or in the form of mullite gel, pressing of the mixture into molded parts, if required, with preceding and/or subsequent drying, and subsequent annealing of the molded parts or firing at temperatures above 1,500° C.

As mentioned above, the fireproof matrix material can thereby also be used with different granular fractions, e.g. with the following skewing:

29-95% by weight of the granular fraction 0.3-1.2 mm 5-71% by weight of the granular fraction <0.3 mm. Particularly high densities are obtained when using a fireproof matrix component with a maximum granular size of 0.3 mm, and particularly if this also has a micronized portion. The use of such a material leads to products with a volume weight closely approaching the theoretical volume weight of aluminum oxide, reduced merely due to the mullite portion (which is very small but important for good stability under temperature changes).

Tests have shown that with use of 3 % $SiO_2$ by weight, introduced as silica gel, it is possible to produce slide plates with excellent corrosion resistance, very good temperature change stability and high refractory quality, in which the presence of mullite could not be demonstrated in X-ray studies. The phenomena are not yet completely explained, particularly not those of surface reactions between the individual particles. It is possible that X-ray amorphous mullite phases develop in the surface areas of the aluminum oxide particles, or that mullite with a different crystallographic structure is formed. However, the procedure according to the invention leads to fireproof molded parts which, while maintaining the advantageous characteristics of the initially mentioned known molded parts of high alumina content based materials, now also have very good corrosion resistance with a reduced mullite content.

In addition, the material characteristics are improved when the fireproof matrix material contains a certain proportion of micronized aluminum oxide, defined as aluminum oxide particles with a granular size of less than 0.1 mm, preferably less than 0.01 mm. This proportion, which apparently also assumes some bonding function in conjunction with a surface coating of silica gel, should be approx. 3-35% by weight, whereby 5-20 % by weight is preferred.

The fine granular fraction, and here specifically the particles with a granular size <0.1, preferably <0.01 mm are to a significant extent responsible for increased surface activity of the particles during firing and consequently also for improved sintering behavior.

By contrast, the coarser granular fraction basically fulfills the abovementioned support function, and by corresponding graduation of the granular size, it is possible to set the porosity of the fired molded part to a predetermined value.

The silica gel preferably consists of almost pure $SiO_2$ in a solution, e.g an alcohol solution, whereby the alcohol will evaporate later. The gel is generally introduced as a 30-50% solution.

In addition to spraying the silica gel onto the alumina particles, one can also obtain a surface coating of the fireproof matrix material in a fluid bed. In order to prevent agglomeration of the particles and achieve a gel coating of each individual grain, it has proven advantageous lo run the fluid chamber at a negative pressure and 'suction in' the particles, whereby the coated material is periodically removed by means of discontinuous operation. Finally, it is suggested that the silica gel be granulated together with the fireproof particles on a granulating plate, whereby one will also achieve a homogeneous mixing and optimal surface coating.

Insofar as it would appear necessary, particularly when only small quantities of the silica gel are used, a binder may also be included in the mixture, e.g. a binder based on polyvinyl alcohol, methyl cellulose, or a phosphate binder. If necessary, one may then eliminate the firing. In his case, the produced molded parts are only annealed, at approx. 500°-700° C. it is also possible to add carbon.

The initial mixture, finely granulated or with graduated granular size, is also the reason why the parts manufactured in this manner have a extremely smooth surface which almost appears glazed. This significantly improves the erosion resistance and the friction resistance, which is particularly important for the slide plate application. In a slide plate lock, scratches will frequently be noticed, particularly where the plate surfaces glide against each other; these necessitate premature exchange of the slide plates, and in extreme cases, they may even lead to a breakthrough of the metal smelting.

Primarily the various qualities of alumina and corundum are suitable as fireproof matrix materials. When materials with a high alumina content are mentioned, this applies to materials with more than 90% by weight of $Al_2O_3$. For the coarser granular fraction one prefers a tabular alumina and/or corundum, while calcinated alumina, micronized if necessary, is also particularly advantageous for the finer granular fraction.

The alumina containing matrix material can be partially replaced with other highly fireproof oxides, e.g. $ZrO_2$, $TiO_2$ and/or $Cr_2O_3$; however the proportion thereof should not amount to more than a total of 20% by weight.

Surprisingly, it has been found that molded parts produced according to the invention can also be fired rapidly, which was not possible with the state of the art procedure. "Rapid firing" is understood to mean pyrogenic processes with a total firing time of less than 24 hours, whereby firing times of 2 hours at approx. 1,600° C. have been found sufficient in individual cases, particularly for relatively small molded parts. By definition, small parts have a maximum height/width or length of 20 cm.

Additional characteristics of the invention can be seen from the characteristics of the other patent claims as well as from other application documentation.

In the following, two batches for production of a slide plate for a slide lock are indicated as examples:

A.

Tabular alumina with granular fraction 0.3-1.2 mm: 55% by weight

Calcinated alumina with granular fraction <0.3 mm: 45% by weight

Silica gel with 3% by weight of $SiO_2$m related to the fire-proof ceramic components.

B.

Tabular alumina with granular fraction 0.3 mm, thereof

25% by weight smaller than <0.01 mm,

Silica gel with 3 % by weight $SiO_2$ related to the fireproof ceramic components.

The use of calcinated alumina with a granular fraction >0.3 mm is also within the range of the invention.

A slide plate produced according to the above batch recipes has an average volume weight of more than 3.1 g/cm$^3$ and a cold pressure strength of more than 100 N/mm$^2$. These values were achieved with a firing temperature of 1,600° C.

The plate has an excellent temperature change stability, a corrosion resistance clearly superior to that of all known $Al_2O_3$ based slide plates, and very good heat characteristics.

The procedure according to the invention thus proves to be simple to execute and, particularly due to the possibility of rapid firing, it is also economical when compared to known procedures, and in addition, it results in fireproof molded parts with improved characteristics as compared to known parts.

We claim:

1. Procedure for manufacturing of fireproof ceramic molded parts with the following steps:
   1.1 preparing a mixture on the basis of a
      1.1.1 ceramic material with an $Al_2O_3$ content of greater than 90% by weight in a granular fraction of less than 3 mm, and
      1.1.2 0.5–4% by weight $SiO_2$, introduced as silica gel or mullite gel, wherein
      1.1.3 the gel is sprayed onto the ceramic material in order to coat said individual ceramic particles,
   1.2 pressing of the mixture to molded parts, and
   1.3 subsequently annealing of the molded parts or firing at temperatures above 1,500° C.

2. Procedure according to claim 1, wherein a material according to step 1.1.1 of claim 1 is used with a granular fraction of less than 1.2 mm.

3. Procedure according to claim 1, wherein the material of step 1.1.1 has
   3.1.1 29–95% by weight of a granular fraction of 0.3–1.2 mm and
   3.1.2 5–71% by weight of a granular fraction of less than 0.3 mm.

4. Procedure according to claim 1, wherein the material of step 1.1 has
   4.1.1 30–90% by weight of a granular fraction of 0.3–1.2 mm,
   4.1.2 5–35% by weight of a granular fraction of 0.1–0.3 mm, and
   4.1.3 5–35% by weight of a granular fraction of <0.1 mm.

5. Procedure according to claim 1, wherein the material of step 1.1.1 has a granular size of less than 0.3 mm.

6. Procedure according to claim 1, wherein the material of step 1.1.1 has 5–20% by weight in a granular size range of <0.01 mm.

7. Procedure according to claim 1, wherein, prior to the pressing, the mixture is set for a residual moisture of 05–1.0% by weight.

8. Procedure according to claim 1, wherein tabular alumina, calcinated alumina and/or corundum is used as the material of step 1.1.1.

9. Procedure according to claim 1, wherein a chemical binder is added to the mixture of the material of step 1.1.1 and the gel.

10. Procedure according to claim 9, wherein the binder is added in a quantity of up to 7% by weight, related to the total mixture.

11. Procedure according to claim 10, wherein polyvinyl alcohol, methyl cellulose, or an organically modified phosphoric acid is used as binder.

12. Procedure according to claim 9, wherein the binder is sprayed onto the material of step 1.1.1.

13. Procedure according to claims 1 or 9, wherein the material of steps 1.1.1 is coated with the gel and/or the binder on a fluid bed.

14. Procedure according to claim 13, wherein fluidization is achieved by means of a negative pressure set for a fluid chamber.

15. Procedure according to claims 1 or 9, wherein the gel and/or the binder is/are mixed with the material of step 1.1.1 on a granulation plate.

16. Procedure according to claim 1, wherein a component containing carbon is added to the mixture of the material of step 1.1.1 and the gel.

17. Procedure according to claim 16, wherein the carbon containing component is added in a quantity of 5–15% by weight, in relation to 100% of the mixture according to step 1.1 of claim 1.

18. Procedure according to claim 16, wherein the carbon containing component is added in the form of a resin.

19. Procedure according to claim 1, wherein the material of step 1.1.1 is partially replaced with $ZrO_2$, $TiO_2$ and/or $Cr_2O_3$.

20. Procedure for manufacturing of fireproof ceramic molded parts with the following steps:
   1. preparing a mixture on the basis of a
      1.1.1 ceramic material with an $Al_2O_3$ content greater than 90% by weight in a granular fraction less than 3 mm, and
      1.1.2 0.5–4% by weight $SiO_2$, introduced as silica gel or mullite gel, wherein
      1.1.3 the gel is sprayed onto the ceramic material in order to coat said individual ceramic particles,
      1.1.4 distributing the gel throughout the mixture to obtain during subsequent thermal treatment of fine mullite formation substantially throughout the mixture to assure high resistance to corrosion to metal smelts and to assure high temperature resistance,
   1.2 pressing of the mixture to molded parts, and
   1.3 subsequently annealing the molded parts or firing at temperatures above 1,500° C.

* * * * *